United States Patent Office.

GEORGE S. MEIKLE, OF STERLING, ILLINOIS.

Letters Patent No. 81,663, dated September 1, 1868.

IMPROVED SHELLAC VARNISH.

*The Schedule referred to in these Letters Patent and making part of the same.*

TO ALL WHOM IT MAY CONCERN:

Be it known that I, GEORGE S. MEIKLE, of Sterling, in the county of Whiteside, and State of Illinois, have invented a new and improved Shellac Varnish; and I do hereby declare that the following is a full, clear, and exact description thereof, which will enable those skilled in the art to make and use the same.

This invention relates to a varnish formed of new materials, and adapted to various uses, for protecting wooden and other surfaces from the action of water, moisture, and decay.

Shellac varnish has for a long time been known and used as a water-proof covering for foundry-patterns, and for other articles made of wood, and alcohol has been the solvent used. The cost of varnish thus made (of two very expensive materials) has very much limited its use, and consequently other and cheaper liquids have been used instead of a good water-proof varnish.

To find a solvent for shellac, whereby a good water-proof varnish could be made at a greatly reduced cost, is the object which I have had in view in pursuing my experiments.

After much research, I have discovered that carbonate of ammonia and water combined will dissolve shellac, and form a varnish equal to that prepared from shellac in any other manner.

In carrying out my invention, I take one gallon of rain-water, and raise the temperature to the boiling-point. I then add one pound of gum-shellac, and one and three-fourths of an ounce of carbonate of ammonia. This mixture I boil about five minutes, and when cool the varnish is formed and ready for use.

This varnish may be used instead of oil for mixing lead or other pigments for making paint, and surfaces so painted will be found to be covered with a coating as durable as the best paint, and perfectly water-proof.

I claim as new, and desire to secure by Letters Patent—

A varnish formed of gum-shellac, combined with the ingredient herein named, and substantially as described.

GEORGE S. MEIKLE.

Witnesses:
 JOHN R. DIXON,
 J. D. WALPOLE.